Jan. 24, 1956  L. F. HEHN  2,732,054
COIN CHANGING DEVICE
Filed Jan. 10, 1948  10 Sheets-Sheet 1

Inventor:
Louis F. Hehn
By: [signature]

Attorney:

Jan. 24, 1956     L. F. HEHN     2,732,054
COIN CHANGING DEVICE
Filed Jan. 10, 1948     10 Sheets-Sheet 2

Inventor:
Louis F. Hehn
By
Attorney

Jan. 24, 1956 L. F. HEHN 2,732,054
COIN CHANGING DEVICE
Filed Jan. 10, 1948 10 Sheets-Sheet 3
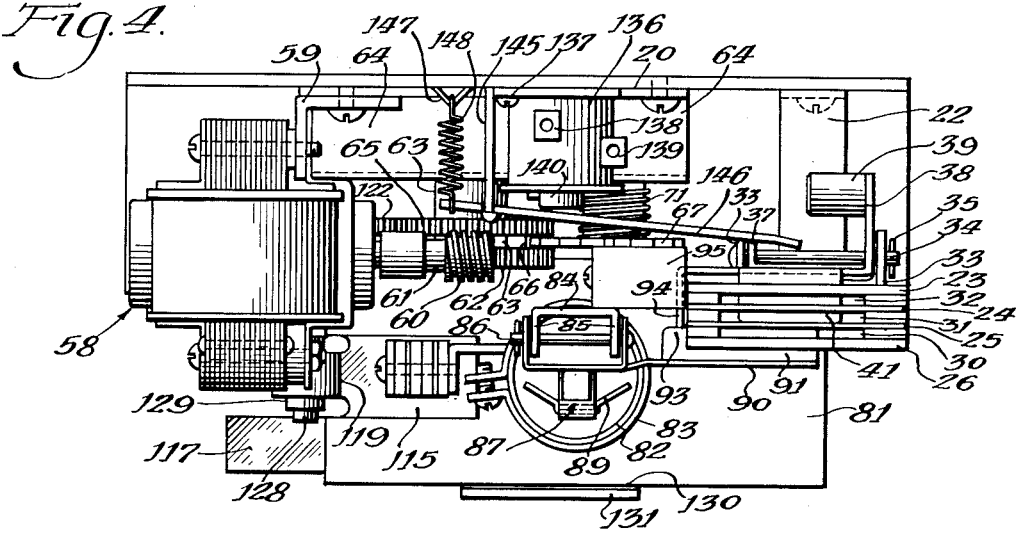
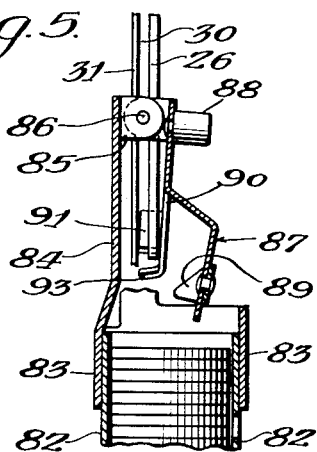
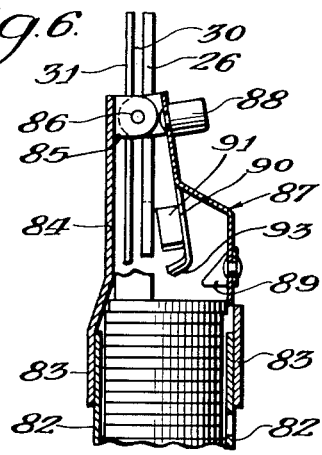
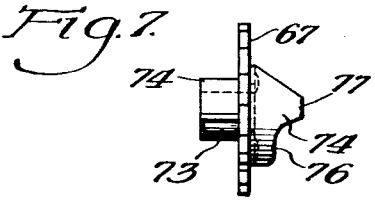
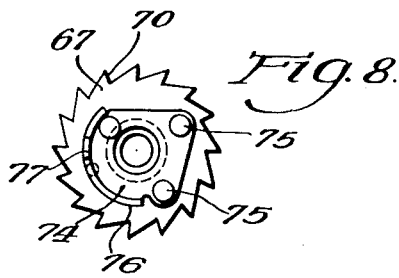
Inventor:
Louis F. Hehn
By: [signature]
Attorney Jan. 24, 1956 L. F. HEHN 2,732,054
COIN CHANGING DEVICE
Filed Jan. 10, 1948 10 Sheets-Sheet 4

Inventor:
Louis F. Hehn
By Carl V. Lloyd
Attorney

Jan. 24, 1956  L. F. HEHN  2,732,054
COIN CHANGING DEVICE
Filed Jan. 10, 1948  10 Sheets-Sheet 5
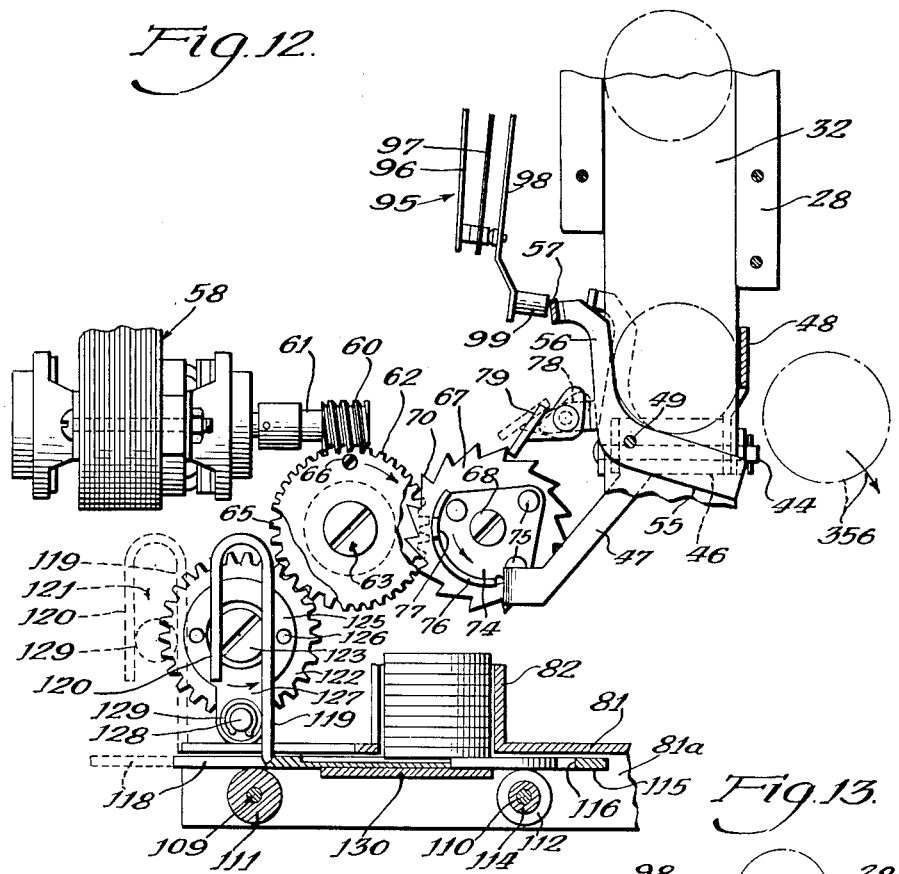
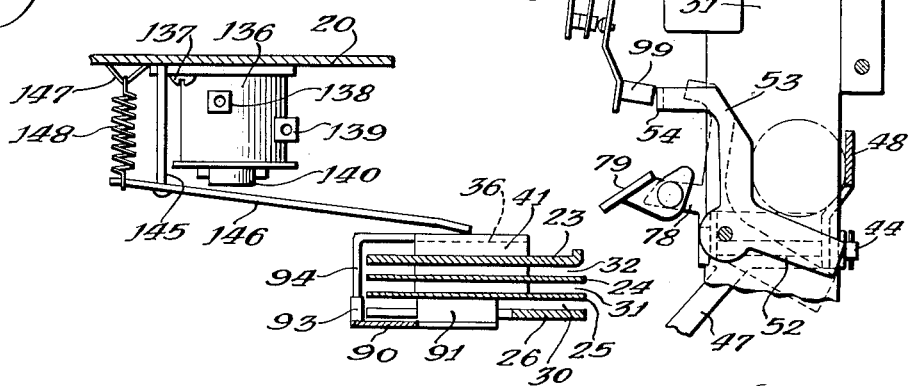
Inventor:
Louis F. Hehn
By: [signature]
Attorney

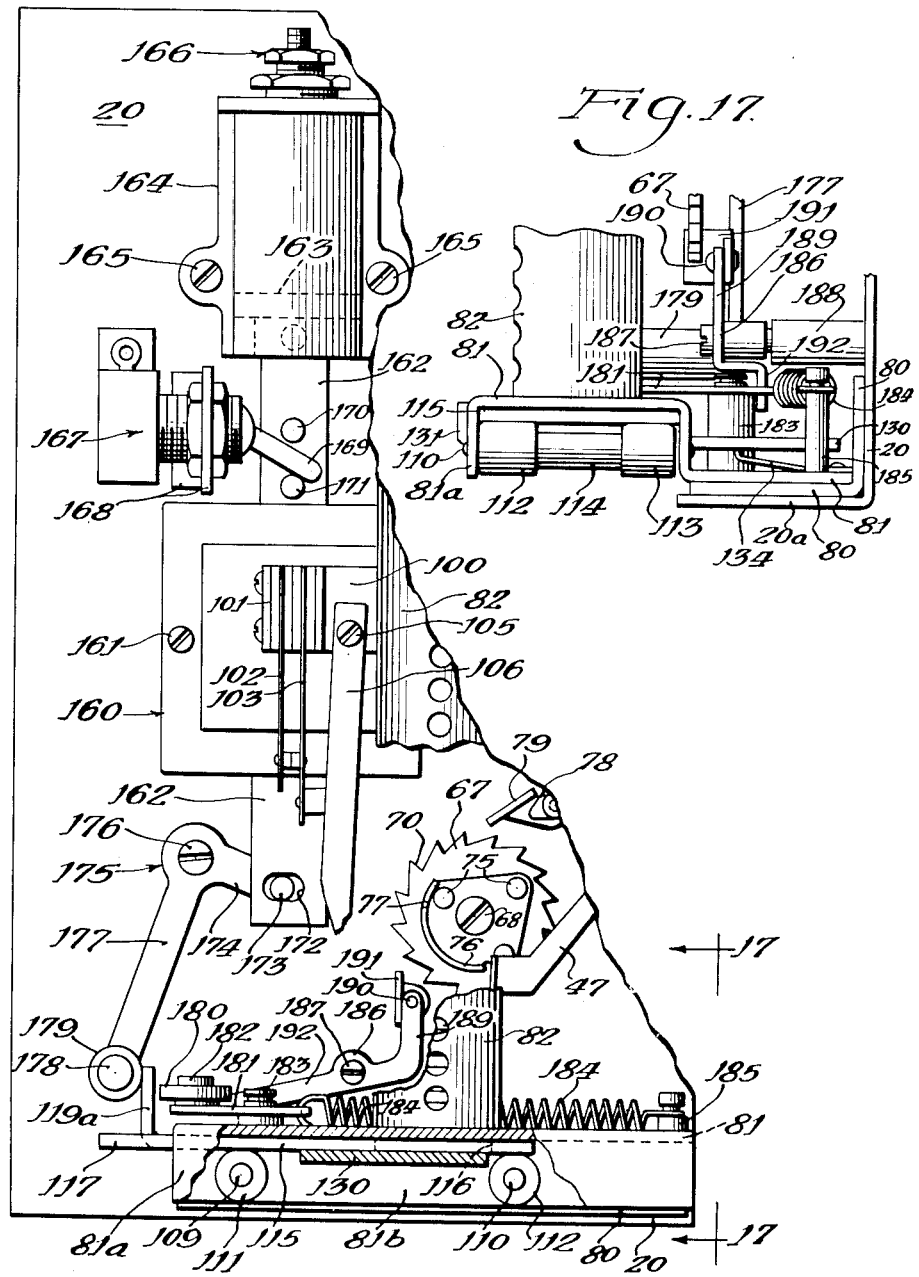

Jan. 24, 1956   L. F. HEHN   2,732,054
COIN CHANGING DEVICE
Filed Jan. 10, 1948   10 Sheets-Sheet 7

Fig. 18.

Inventor:
Louis F. Hehn
By: Carl L. Lloyd
Attorney

Jan. 24, 1956 L. F. HEHN 2,732,054
COIN CHANGING DEVICE
Filed Jan. 10, 1948 10 Sheets-Sheet 8

Inventor:
Louis F. Hehn
By
Attorney

Jan. 24, 1956

L. F. HEHN 2,732,054

COIN CHANGING DEVICE

Filed Jan. 10, 1948

Inventor:
Louis F. Hehn
By: [signature]
Attorney

Jan. 24, 1956   L. F. HEHN   2,732,054
COIN CHANGING DEVICE
Filed Jan. 10, 1948   10 Sheets—Sheet 10

Inventor:
Louis F. Hehn
By
Attorney

United States Patent Office 2,732,054
Patented Jan. 24, 1956

2,732,054

COIN CHANGING DEVICE

Louis F. Hehn, Chicago, Ill., assignor to Mills Industries, Incorporated, Chicago, Ill., a corporation of Illinois Application January 10, 1948, Serial No. 1,498

17 Claims. (Cl. 194—10)

This invention relates to automatic coin changers and more particularly to a coin changing device suitable for use either as a self-contained mechanism for delivering change in an amount equal to the full value of a coin deposited therein or for use in conjunction with coin-operated vending machines which require deliveries of change in amounts less than the value of certain coins received thereby. A vending machine of this type, for example, may be one arranged to vend a five-cent item of merchandise upon the insertion of either a nickel, dime or quarter, the correct value in change being required to be returned to the purchaser with the delivery of merchandise when a dime or quarter has been received by the machine.

An object of the present invention is to provide a coin changing device having therein improved mechanical means, actuated by the presence of a coin requiring change, for closing a circuit to energize a change dispensing mechanism.

A further object of the invention is to provide a coin changing device of the above character in which said mechanical means, by the presence of a coin requiring change, is retained in an actuated position to positively maintain said circuit in a closed condition until a predetermined amount of change has been dispensed for said coin, whereupon said coin will fall from said device and said mechanical means will open said circuit.

Another object of the invention is to provide an improved means within said coin changing device for retaining a coin in a fixed position while change is being dispensed therefor and for thereafter automatically releasing said coin from said position.

Still another object of my invention is to provide in a coin changing device of this character means by which said device may be quickly and easily adjusted to deliver different numbers of coins of a small denomination in return for a coin of a larger denomination.

A further object of my invention is to provide in a coin changer of this kind an improved means for preventing the insertion of coins therein while change is being dispensed therefrom.

Another object of the invention is to provide in a coin changing device of the above character a change dispensing slide supported upon rollers whereby said slide may be easily moved to eject change.

A still further object of my invention is to provide in conjunction with said slide means for controlling the speed of its operation.

Still another object of my invention is to provide in a coin changing device of the above description means by which all or any part of a supply of change retained therein may be quickly emptied from a container therefor.

A further object of my invention is to provide in a coin changer of the above character a quickly attachable means for preventing the dispensing of change from said device until a predetermined number of small coins, such as pennies, have been received by said means.

Other objects and advantages of the invention will be apparent from the following description taken in connection with the accompanying drawings, in which:

Fig. 4 is a top plan view of said coin changer;

Fig. 5 is a fragmentary sectional view taken on the line 5—5 in Fig. 1 to bring out in detail the construction of a mechanism for automatically controlling the supply of coins in a change supply tube;

Fig. 6 is a similar view showing said mechanism in another position;

Fig. 7 is a detailed side view of a ratchet wheel employed in my coin changer;

Fig. 8 is a front view of the same;

Fig. 12 is a fragmentary front elevational view partly in cross-section showing the relationship between the ratchet wheel and the mechanism for motivating the change dispensing slide while change for a United States quarter is being dispensed;

Fig. 13 is a fragmentary view showing the mechanism for holding a United States dime while change is being dispensed therefor;

Fig. 14 is a fragmentary cross-sectional view taken substantially on the line 14—14 in Fig. 2;

Fig. 16 is a fragmentary front elevational view of a variation of my coin changer showing the same provided with a solenoid and dash-pot arrangement for operating the coin dispensing slide and controlling the speed of its operation;

Fig. 17 is a fragmentary end view of the same taken on the line 17—17 in Fig. 16;

Fig. 18 is a fragmentary front elevational view of still another variation of the coin changer showing the same provided with a solenoid and a wind-vane assembly for controlling the operation of said coin dispensing slide;

Figure 24:
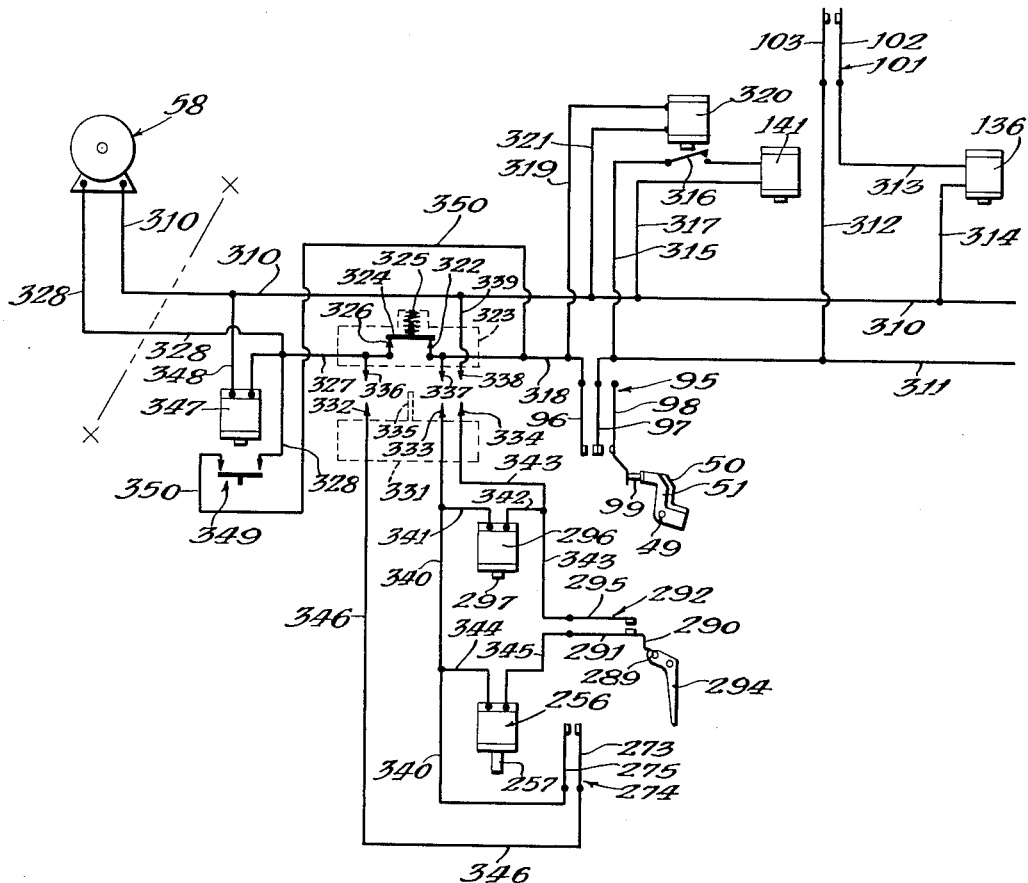
Fig. 24 is a diagrammatic view of an electrical circuit suitable for use with my coin changer when the same is provided with an electric motor for motivating the coin dispensing slide.
Figure 25:
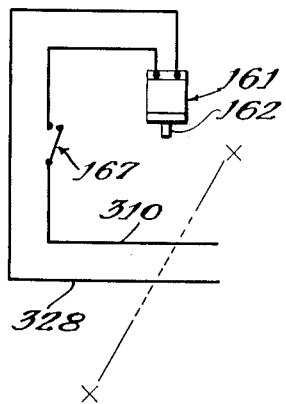
Figure 26:
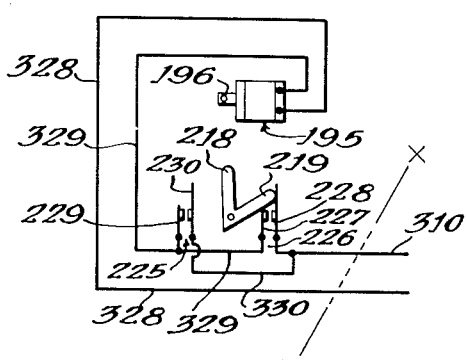

Fig. 25 is a fragmentary view of the same showing a modification of a portion of said circuit to the left of the line x—x in Fig. 24, said modification being applicable when the coin changer is provided with the solenoid and dash-pot arrangement shown in Fig. 16; and Fig. 26 is a similar view showing a modification of the circuit adopted for use when said coin changer is provided with the solenoid and wind-vane assembly illustrated in Fig. 18.

In the embodiment of the invention thus illustrated a vertical back plate 20 is provided as a frame upon which various parts of the device to be hereinafter described are mounted. Said back plate may be provided with suitable means (not shown) for mounting the same within a coin-operated vending machine or the like, or said back plate may comprise the back side of a box (not shown) within which the entire mechanism of the coin changer may be enclosed, suitable openings being provided in said box through which coins may be received and change may be discharged.

Figure 2:
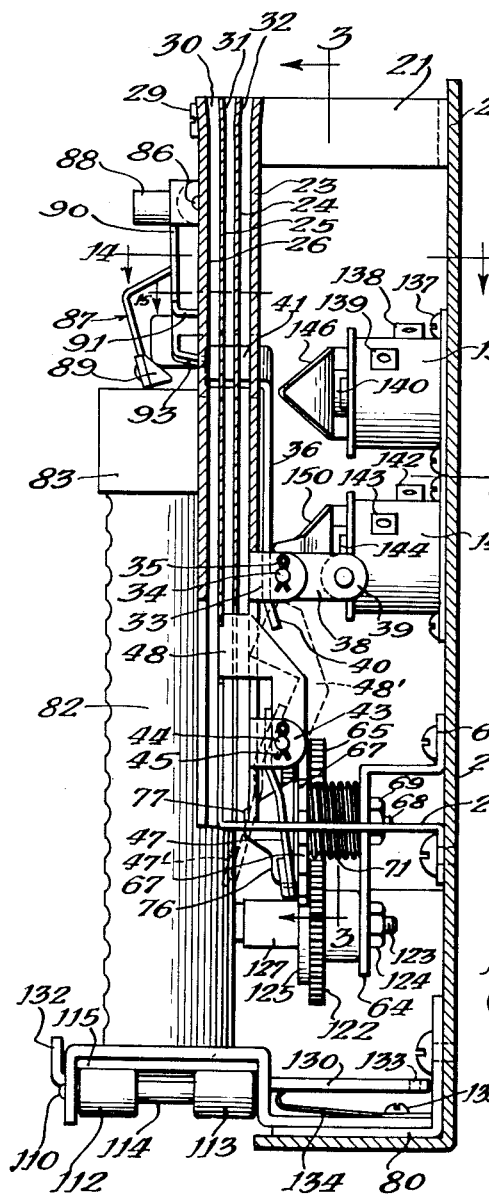
Fig. 2 is a sectional view thereof taken on the line 2—2 in Fig. 1.

Mounted upon the back plate 20, as by brackets 21 and 22, are a plurality of vertical walls 23, 24, 25 and 26 (Fig. 2). Said walls may be separated each from the other, by means of fiber blocks 27 and 28 (Fig. 3) disposed one above the other, and may be assembled as a unit by means of screws 29 which may be suitably threaded through said walls and blocks. In the embodiment of the invention shown, said vertical walls form the sides for coin chutes 30, 31 and 32 which may, for example, be properly dimensioned to receive United States nickels, dimes and quarters, respectively.

Figure 3:
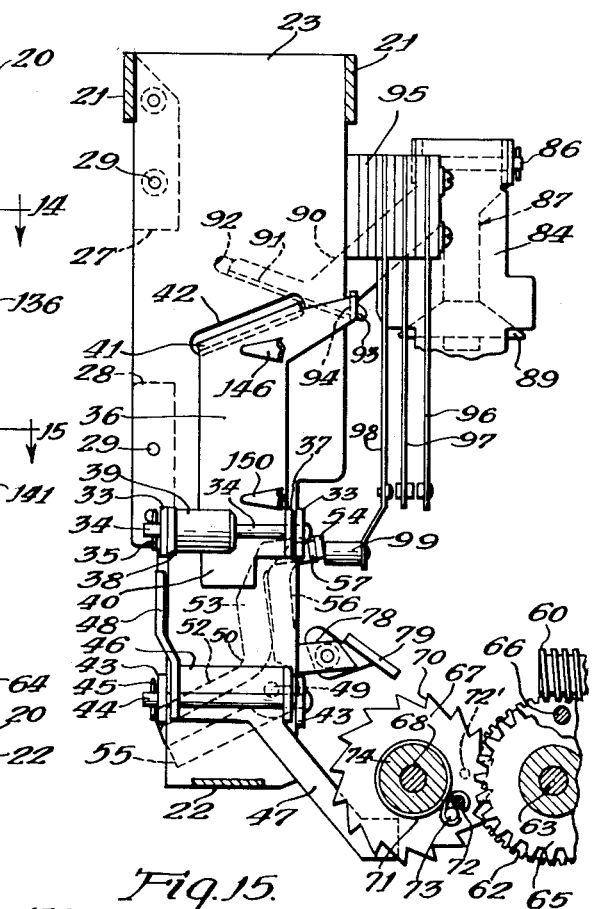
Fig. 3 is a fragmentary sectional view of the same taken on the line 3—3 in Fig. 2.

A pair of ears 33 are formed on opposite side edges of the wall 23, and supported thereby is a horizontally disposed pin 34 which may be headed at one of its ends and secured in said ears by means of a small cotter key 35 passed through its other end (Figs. 2 and 3). A substantially vertically disposed plate 36 is hinged upon said pin by means of ears 37 and 38 formed on either side of the plate. The latter ear extends outwardly from said plate beyond said pin and has fixed on its extremity a counterweight 39 which tends to pivot the plate on the pin in a clockwise direction as viewed in Fig. 2. A lip 40 is formed on the bottom edge of the plate and contacts the back of the wall 23 in the movement of said plate to act as a stop therefor to limit the clockwise pivoting range of the same to approximately thirty degrees.

Upon the upper edge of the plate 36, at a right angle thereto, is formed a coin rejection finger 41 which is arranged to protrude through a diagonally disposed opening 42 in the walls 23, 24, 25 and 26 to provide a sloping coin block in the coin passages 30, 31 and 32 when the plate 36 is pivoted in a counter-clockwise direction as viewed in Fig. 2, the counterclockwise movement of said plate being limited by the wall 23.

Below said plate another pair of ears 43 are formed on opposite sides of the wall 23 and horizontally extending through said ears is a second pivot pin 44 which, like the pin 34, may be headed at one of its ends and secured in the ears by means of a cotter key 45 passed through its other end. Upon the pin 44 is pivoted a U-frame 46 which has an arm 47 extending diagonally downwardly from one end thereof and having formed upon its other end a coin gate 48. Said U-frame together with the arm 47 and the coin gate 48 are pivotable on the pin 44 as illustrated in Fig. 2. In its normal position the coin gate forms a closure across the sides of the coin passages 31 and 32 below the spacing block 28. When the U-frame 46 is pivoted, the coin gate and arm assume positions indicated in Fig. 2 by the numerals 48′ and 47′, in which condition said coin gate is moved to open the closure which it normally provides across the coin passages 31 and 32. Although not shown, spring means may be provided tending to hold the coin gate in its closed position or, if desired, the arm 47 may be weighted to provide the same result.

Figure 1:
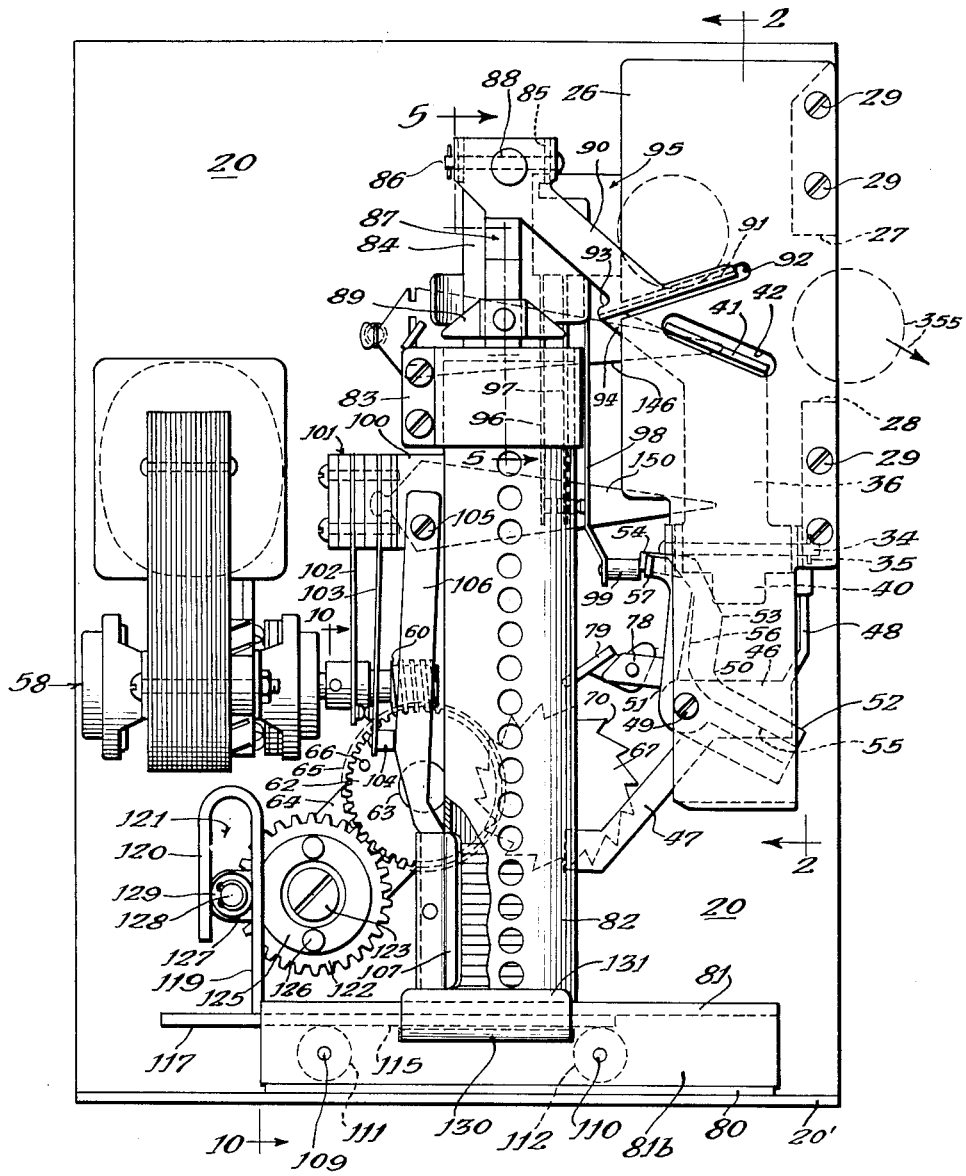
Fig. 1 is a front elevational view of a coin changer embodying my invention.

Near the lower ends of the walls 23, 24, 25 and 26 a screw 49 is passed horizontally therethrough. Upon said screw coin seats 50 and 51 are pivotally mounted in the coin passages 31 and 32, respectively. The coin seat 50 has a finger 52 formed thereon which extends generally diagonally downwardly from the pivot center of the seat and also formed upon said seat, at approximately a right angle with the finger 52, is a hook-shaped finger 53 which extends upwardly and has formed on its extremity a lip 54. The coin seat 51 is provided with fingers 55 and 56 which correspond to the fingers 52 and 53, respectively, and the finger 56 has a lip 57 formed thereon which corresponds to the lip 54 on the finger 53 (Figs. 1 and 3).

Figure 10:
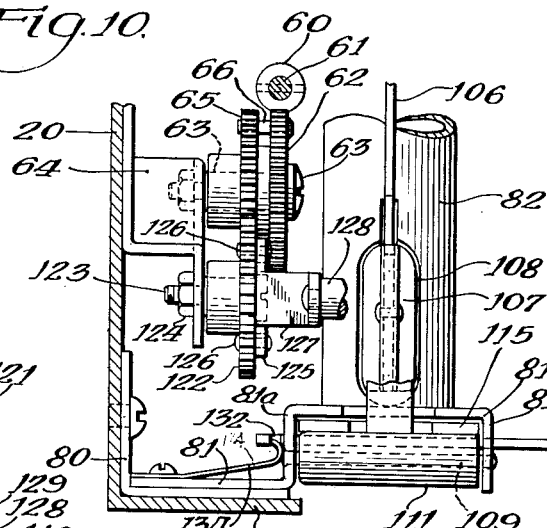
Fig. 10 is a fragmentary elevational view partly in cross-section taken substantially on the line 10—10 in Fig. 1 to illustrate a portion of a mechanism for motivating said change dispensing slide.

An electric motor, indicated generally by the numeral 58, may be mounted upon the back plate 20 by means of a bracket 59 (Fig. 4). A worm 60 is fixed upon the extremity of the shaft 61 of said motor and is arranged to drive a worm gear 62 which is rotatably mounted upon a short shaft bolt 63 supported by a bracket 64 securely mounted upon the back plate (Figs. 4, 10 and 12). Similarly mounted upon the shaft bolt 63, between the worm gear 62 and the bracket 64, is a spur gear 65 which is spaced from the worm gear and is fixed to rotate therewith by means of a pin 66 which extends between the two and may be threaded through each near their respective peripheries.

To one side of the gears 62 and 65 a ratchet wheel 67 is rotatably mounted upon another short shaft bolt 68 which may be secured to the bracket 64 by means of a nut 69. The ratchet wheel is so disposed that its periphery, upon which is formed teeth 70, lies in the path of the pin 66 which, it will be understood, moves in a circular path as the gears 63 and 65 are driven by the motor 58. Each time the pin 66 is moved past the ratchet wheel, said pin engages one of the teeth 70 thereon and advances said ratchet wheel, in a counter-clockwise direction (as viewed in Fig. 1), through an arc equivalent to the space between said teeth.

A coil spring 71, having one of its ends fixed to a pin 72 mounted upon the bracket 64 and its other end fixed to a pin 73 on said wheel, is disposed about a hub 74 of said ratchet wheel and tends to return said wheel (in a clockwise direction as viewed in Fig. 1) to its normal position after the pin 66 has engaged one of the teeth 70 and has advanced the ratchet wheel in the manner above described.

The pin 72, in addition to serving as an anchor for one end of the spring 71, also acts as a stop for the ratchet wheel in its spring impelled return to its normal position. To this end the pin 72 is disposed in the path of the pin 73. In its returning motion the ratchet wheel carries the pin 73 into contact with the pin 72, as shown in Fig. 3, and the movement of said wheel is thus stopped. Although illustration is believed unnecessary for clear understanding, it is evident that the normal position of the ratchet wheel is determined by the position of the pin 72. Accordingly, in order to provide variable normal positions for said ratchet wheel, for purposes hereinafter described, the pin 72 may be adjustably mounted in any suitable manner upon the bracket 64 so as to be movable to selective positions in the path of the pin 73.

Upon the front side of the ratchet wheel an arc-shaped cam 74 is fixed thereto as by rivets 75 (Figs. 7 and 8). Said cam has a low cam surface 76 and a high cam surface 77, both of which may move successively into contact with the lower extremity of the arm 47 of the coin gate carrying U-frame 46 when the ratchet wheel is advanced. When the low cam surface comes into contact with said arm, the arm is moved to pivot the U-frame 46 on the pin 44 sufficiently to carry the coin gate 48 to the right, as viewed in Fig. 2, beyond the open side of the coin passage 31. Similarly, when the high cam surface 77 has moved into contact with said arm, the coin gate 48 is carried to the position indicated by the numeral 48′ in Fig. 2 to clear the open side of the coin passage 32.

The finger 56 of the coin seat 51 has provided on the back side thereof a bracket 78 upon the extremity of which is pivotally mounted a pawl 79 which engages the teeth 70 of the ratchet wheel 67 when said coin seat has been pivoted to a position shown by the solid lines in Fig. 12.

A shelf 20' is formed upon the base of the back plate 20 and upon said shelf, by means of a bracket 80, a coin dispensing slide frame 81 is mounted, said frame having vertical portions 81a and 81b formed therein to give said frame the general cross-sectional shape of an inverted U (Fig. 10).

An opening is provided in the upper surface of the inverted U portion of said frame large enough to receive United States nickels or other coins to be used as change. About said hole a coin tube 82 is fixed upon said upper surface of said frame, as by soldering or the like, and at the upper extremity of said tube a ring-clamp 83 is attached about the same. Upon the back side of said ring-clamp is formed an extension 84 which projects upwardly above the top of the coin tube and has formed upon the upper end thereof two ears 85 through which is passed a pin 86. Pivotally suspended from said pin is a coin level controlling lever shown generally at 87 (Figs. 4, 5 and 6). Said lever is provided with a counterweight 88 which tends to cause the same to swing upon the pin 86 toward the extension 84 as illustrated in Fig. 5. The lowermost end of the lever 87 extends downwardly into said coin tube slightly below the level of the top of said ring-clamp, and upon said lever adjacent the lower end thereof may be fixed an arc-shaped coin contact member 89.

Figure 15:
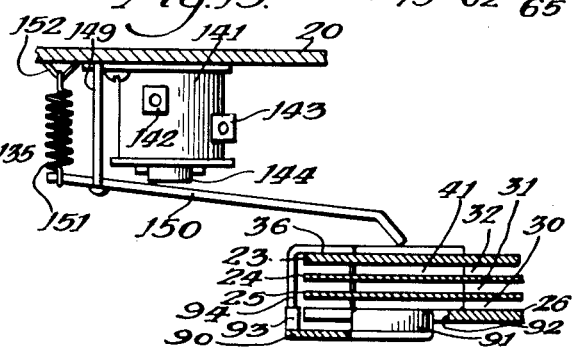
Fig. 15 is a similar view taken substantially on the line 15—15 in Fig. 2.

Extending diagonally downwardly from the upper portion of the lever 87 is an arm 90 upon the lower end of which is formed a sloping floor 91 which is arranged to enter the coin passage 30 through a diagonally disposed opening 92 (see Fig. 1) in the wall 26 when the lever 87 is swung by the counterweight 88 toward the extension 84. A finger 93 is formed on the back side of said arm 90 adjacent the lower end of the floor 91 and is arranged to make contact with a similar finger 94 which is formed upon the upper end of the plate 36 adjacent the upper end of the finger 41 thereon (Figs. 3 and 15).

Upon the rear side of the extension 84 of the ring-clamp 83 is attached, in any suitable manner, a spring leaf switch 95 (Fig. 3) having leaves 96, 97 and 98. Each of said leaves has a contact button thereon and upon the lower extremity of the leaf 98 is attached a bumper pad 99 of a suitable dielectric material arranged to be contacted (to close the switch) by the lips 54 and 57 of the coin seats 50 and 51, respectively, when the latter are pivoted on their mounting screw 49. Also attached to the ring-clamp 83, as by a bracket 100 (Fig. 1), may be another spring leaf switch 101 having switch leaves 102 and 103, the latter of which may have mounted upon its lower end a dielectric pad 104 similar to the pad 99. Pivotally suspended from a screw 105 threaded into or otherwise attached to the bracket 100 may be an arm 106 having attached to the lower end thereof an arc-shaped flange 107. The weight distribution of the arm 106 may be such that said arm will tend to swing on the screw 105 toward the coin tube 82 and cause the flange 107 to enter said tube through an appropriate opening 108 in the side of the latter when the level of coins therein has been reduced to a predetermined level in a manner hereinafter described (Figs. 1 and 10). The presence of coins in said tube above said predetermined level will expel the flange from the interior thereof causing the arm 106 to pivot on the screw 105. In so pivoting said arm contacts the dielectric pad 104 to move the switch leaf 103 into contact with the leaf 102 and thus close the switch 101. Conversely, it will be understood that when the flange 107 is allowed to enter the coin tube through the opening 108, the switch leaf 103 will move out of contact with the leaf 102 and the switch 101 will thus be opened.

Figure 9:
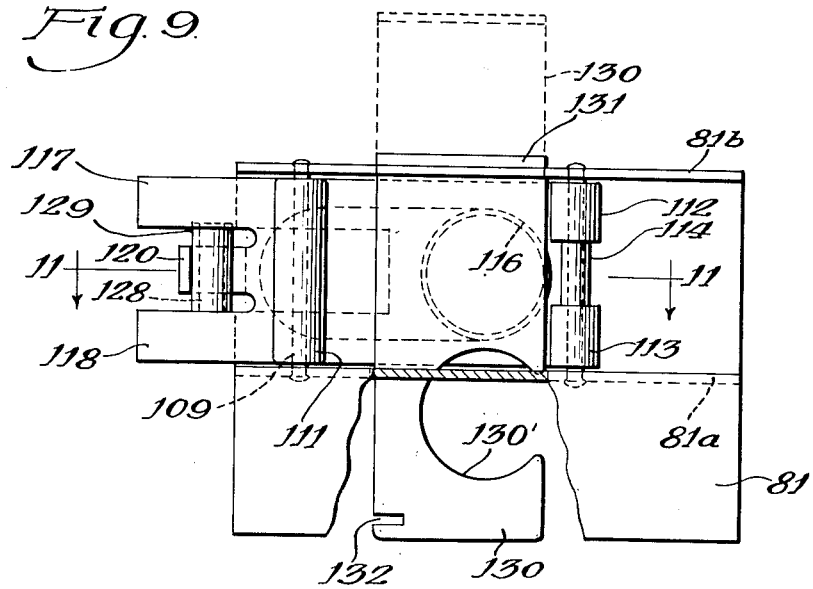
Fig. 9 is a fragmentary bottom plan view of said coin changer showing in detail the construction of a change dispensing slide.
Figure 11:
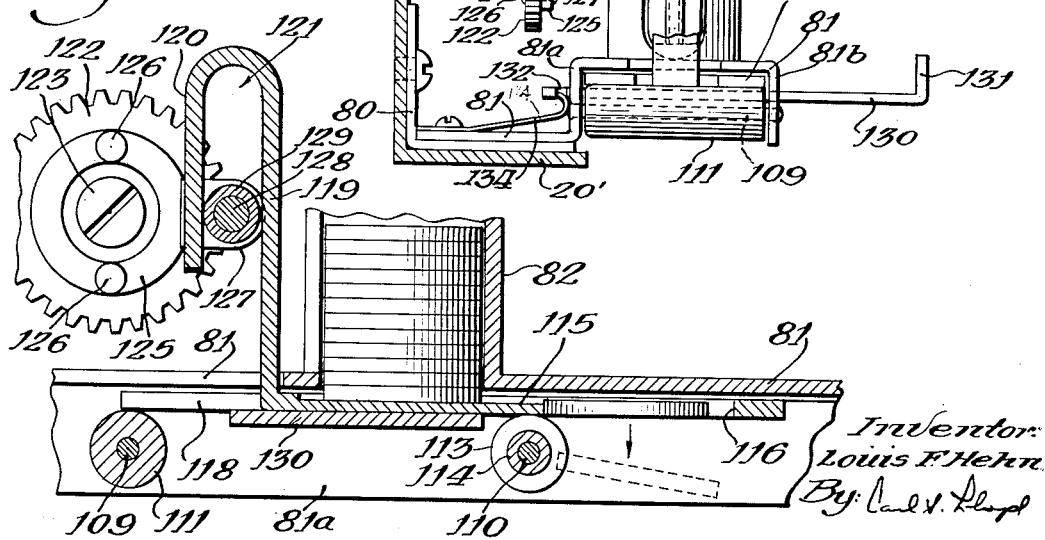
Fig. 11 is a similar view on an enlarged scale taken on the line 11—11 in Fig. 9.

Shaft pins 109 and 110 are horizontally disposed between the vertical portions 81a and 81b of the coin dispensing slide frame 81 and are supported by the same (Figs. 10 and 11). A roller 111 is mounted upon the shaft pin 109, and two rollers 112 and 113, together with a spacer 114 therebetween, are mounted upon the shaft pin 110 (Fig. 9). Supported upon said rollers is a coin dispensing slide 115 of a thickness substantially equal to that of coins to be used as change. Said slide has a round opening 116 formed therein of a diameter somewhat larger than the diameter of said coins. One end of said slide is provided with extensions 117 and 118 on each side thereof, and between said extensions upon the end of the slide is formed a slide impelling member 119 which extends upwardly and has its top portion 120 bent over as a hook to provide a vertical race-way defined by opposing surfaces of said member and said top portion and indicated by the numeral 121 (Figs. 1 and 11).

A second spur gear 122 is rotatably mounted upon a shaft bolt 123 which may be secured to the bracket 64 by means of a nut 124 (Figs. 1, 2 and 10). Said spur gear has teeth thereon in mesh with the teeth of the gear 65 and is driven by the latter. Upon the front face of the gear 122 a washer-like ring 125 is mounted as by rivets 126. Upon the periphery of said ring is formed an extension 127 on which is mounted a shaft 128 upon which is provided a roller 129 arranged to travel in the race-way 121 (Figs. 1, 11 and 12). It will thus be understood that as the gears 65 and 122 are driven by the motor 58 the roller 129 will be carried in a circular path and will, as it rides up and down in the race-way 121, cause a reciprocation of the coin dispensing slide 115. When the gear 122 is in the position shown in Fig. 1, the opening 116 in said slide will be positioned directly below the coin tube 82 and will receive a coin therefrom. Immediately below said slide and beneath said coin tube is a transverse slide 130 which is supported by the vertical portions 81a and 81b of the frame 81 and is passed through appropriate openings therein (not shown). Said transverse slide has an opening 130' therein of a size slightly larger than the diameter of the coins to be used as change (Fig. 9). The front end of the slide 130 may have a lip 131 formed thereon (Fig. 10) and adjacent the rear of said slide upon one side thereof a notch 132 may be formed therein. A spring 134 (Figs. 1 and 17) may be attached at one of its ends to the bracket 81, as by a screw 135, and the other end of said spring may be formed to be engaged by the notch 132 in said transverse slide to act as a stop therefor when the same is moved in a manner and for a purpose hereinafter described.

A solenoid 136 is mounted upon the back plate 20, as by screws 137, approximately on a level with the top of the plate 36. Said solenoid may be provided with terminals 138 and 139 (Figs. 2, 4 and 14) and may have a solid core 140. Below the solenoid 136 another solenoid 141 is similarly mounted and provided with terminals 142 and 143 and a solid core 144 (Figs. 2 and 15). Beside the solenoid 136 a pin 145 is mounted in any suitable manner at one of its ends upon the back plate 20. Upon the free end of said pin is pivotally mounted a tapered finger 146, the end of said pin being notched and twisted in a well-known manner to allow the finger thereon to pivot only in a horizontal plane. An eye 147 is provided on the plate 20 beside the pin 145 and attached to said eye is an end of a coil tension spring 148 which has its other end suitably attached to the adjacent end of the finger 146. Said finger extends from said spring and pin across the face of the core 140 of the solenoid 136 to a position behind the plate 36 (Figs. 4 and 14).

A pin 149, identical to the pin 145, is similarly mounted upon the back plate 20 beside the solenoid 141 and carries upon its end a finger 150 which, like the finger 146, may be pivoted only in a horizontal plane. A tension spring 151 is attached to an end of the finger 150 adjacent the pin 149 and an eye 152 is provided on the plate 20 to anchor said spring. The finger 150 extends from the spring and pin across the face of the core 144 of the solenoid 141 to a position behind the plate 36, said finger differing from finger 146 only that its end disposed behind the plate 36 is bent at more of an angle toward said plate as is best shown in Fig. 15.

From the above description it will be understood that, when the solenoid 136 is energized, the finger 146 will be drawn against the face of the core 140. Similarly, when the solenoid 141 is energized the finger 150 will be drawn to the face of the core 144. On the other hand, when solenoid 141 is de-energized, the spring 151 causes the finger 150 to pivot on the pin 149, the end of said finger making contact with the back side of the plate 36 to pivot the latter on the pin 34 and cause the finger 41 to enter the opening 42 in the walls 23, 24, 25 and 26 and provide a sloping block across the coin passages 30, 31 and 32 as illustrated in Figs. 2 and 15. This pivoting motion of the plate 36 carries the finger 94 thereon into contact with the finger 93 on the arm 90 and thus causes the floor 91 on said arm to be moved out of the passage 30 to provide space in the latter for the finger 41 (Fig. 15).

When the solenoid 136 is de-energized, the spring 148 pivots the finger 146 against the back side of the plate 36 and causes the latter to pivot on the pin 34 only so far as to move the finger 41 on said plate into a blocking position across the coin passages 31 and 32, the floor 91 on the arm 90 being allowed to remain within the coin passage 30 (Fig. 14).

The above described portion of my coin changer may be modified as shown in Figs. 16 and 17 to eliminate the motor 58 and the gears 60, 62, 65 and 122 together with their related parts. In this modification, a solenoid 160 is mounted, as by screws 161, upon the back plate 20 and provided with a vertically disposed slidable core or armature 162. On the upper end of said armature is attached a piston 163 which may reciprocate vertically within the cylinder of a dash-pot 164 mounted upon the back plate 20, as by screws 165, and having at its upper end an ordinary air valve 166 of a type commonly used in association with dash-pots. To one side of the upper portion of said armature a toggle switch, shown generally at 167, may be mounted in a well-known manner upon a bracket 168 which may be secured in any suitable way to the back plate 20. The actuating lever 169 of said toggle switch is arranged to ride between two pins 170 and 171 provided upon said armature between the dash-pot and said solenoid.

At the lower end of said armature a slot 172 is provided therein within which rides a pin 173 attached to an arm 174 of a bell-crank shown generally at 175. Said bell-crank is pivotally mounted upon a pin 176 which is in turn fixed in a suitable manner upon the back plate 20. At the extremity of the bell-crank's other arm 177 is horizontally provided a heavy pin 178 upon which is mounted a roller 179 which is in contact with one side of a modified form 119a of the slide impelling member 119. In contact with the other side of said slide impelling member is a roller 180 which is rotatably mounted upon a lever 181 as by a pin 182. Said lever 181 is pivotally mounted upon a vertical post 183 securely attached to the frame 81 (Fig. 17) and is arranged to pivot only in a horizontal plane. A coil tension spring 184 is attached at one of its ends to the end of the lever 181 opposite the end thereof upon which roller 180 is mounted. The other end of said spring is suitably attached to a post 185 which is vertically mounted upon the frame 81.

Another bell-crank 186 is pivotally mounted upon the back plate 20 as by a screw 187 threaded into a horizontal post 188 attached to said plate. At the extremity of one of the arms 189 of said bell-crank is pivotally mounted, as by a rivet 190, a pawl 191 which is engageable with the teeth 70 of the ratchet wheel 67. Another arm 192 of said bell-crank 186 extends downwardly beyond the level of the lever 181 and is arranged to be engaged by the latter.

When the solenoid 160 in the above described modified form of my device is energized, the armature 162 is moved upwardly at a speed controlled by the action of the dash-pot 164. In the upward movement of said armature the bell-crank 175 is pivoted upon the pin 176 and the roller 179 at the end of the arm 177 forces the coin dispensing slide 115 to move to the right as viewed in Fig. 16. As the slide moves the roller 180 is engaged by the impelling member 119a and the lever 181 is pivoted about the post 183 into engagement with the arm 192 to raise the same and thus pivot the bell-crank 186 in a clockwise direction as viewed in Fig. 16. In this manner the pawl 191 is carried into contact with a tooth 70 on the ratchet wheel 67 and the latter thus is advanced one tooth. As the armature 162 reaches the top of its stroke, the toggle switch 167 is snapped to an open position to de-energize the solenoid and the armature retires to its original position by the action of gravity controlled by the dash-pot. The coin dispensing slide, the lever 181, and the bell-crank 186, are caused to return to their original position by the action of the spring 184.

Still another modification for the above described portion of my coin changer is shown in Fig. 18. In the embodiment of the invention there illustrated a solenoid 195 is mounted in any suitable manner upon the back plate 20. Said solenoid is provided with a horizontally disposed slidable armature 196 in one end of which is provided a slot 197 within which rides a pin 198 mounted upon an arm 199. Said arm 199 is pivoted at its upper end upon a screw pin 200 which may be threaded or otherwise attached to the back plate 20. Upon the lower end of the arm 199 is mounted a horizontally disposed pin 201 upon which is rotatably secured a roller 202 which is in contact with a modified form 119b of the impelling member 119 attached to the end of the change dispensing slide 115.

Upon the back edge of the impelling member 119b is formed a strong bracket 203 of a shape similar to the crank 186 in Fig. 16. Said bracket is not fully shown in the Fig. 18, but it will be understood that the bracket extends from the member 119b to a position behind the coin tube 82 identical to the position occupied by the arm 189 shown in Fig. 16. Upon the extremity of the bracket 203 is pivotally mounted a pawl (not shown) which may be identical to the pawl 191 (Fig. 16) and, like the pawl 191, is arranged to engage the teeth 70 of the ratchet wheel 67, one at a time, each time the coin dispensing slide 115 is moved to the right as viewed in Fig. 18.

An arcuate segmental rack, shown generally at 204, is rotatably mounted upon a post 205 fixed in any suitable manner upon the back plate 20. An upper portion 206 of said rack is provided with teeth 207 which are engaged by a small pinion gear 208 which is fixed upon the front end of a shaft 209 which may be suitably bearinged in the plate 20 and upon which shaft is formed a wind-vane 210. The lower portion of said rack has formed thereon a finger 211 upon which is fixed a pin 212. A bracket 213 is fixed to the back plate 20 and a tension spring 214 is fixed at one of its ends to the bracket and at its other end to the pin 212. Another tension spring 215 is attached at one of its ends to the pin 212 and at its other to the arm 199.

Vertically below the post 205 another post 216 is fixed upon the back plate 20 and pivotally mounted thereon is a V-shaped toggle member indicated generally by the numeral 217. Said toggle member is provided with two upwardly extending arms 218 and 219 which are arranged to be alternately engaged by the finger 211 of the rack 205. Beneath the post 216 said toggle member is formed to a point as at 220 and said point is in contact with a leaf spring 221 which is horizontally fixed to a post 222 attached to the back plate 20.

A tension spring 223 is attached at one of its ends to the post 222 and at its other to an eye 224 provided upon the extremity of the extension 117 of the coin dispensing slide 115.

Below the level of the toggle 217 two spring leaf switches, shown generally at 225 and 226, are attached in a suitable manner to back plate 20. The switch 226 is provided with two spring leaves 227 and 228 which tend to maintain contact between contact buttons provided thereon, the leaf 228 being contactable by the arm 219 of the toggle to separate said buttons as shown in Fig. 18. The switch 225 has two spring leaves 229 and 230 which tend to separate and open the contact between buttons provided thereon, the leaf 230 being contactable by the arm 218 of the toggle to close said contact between said leaves.

Figure 19:
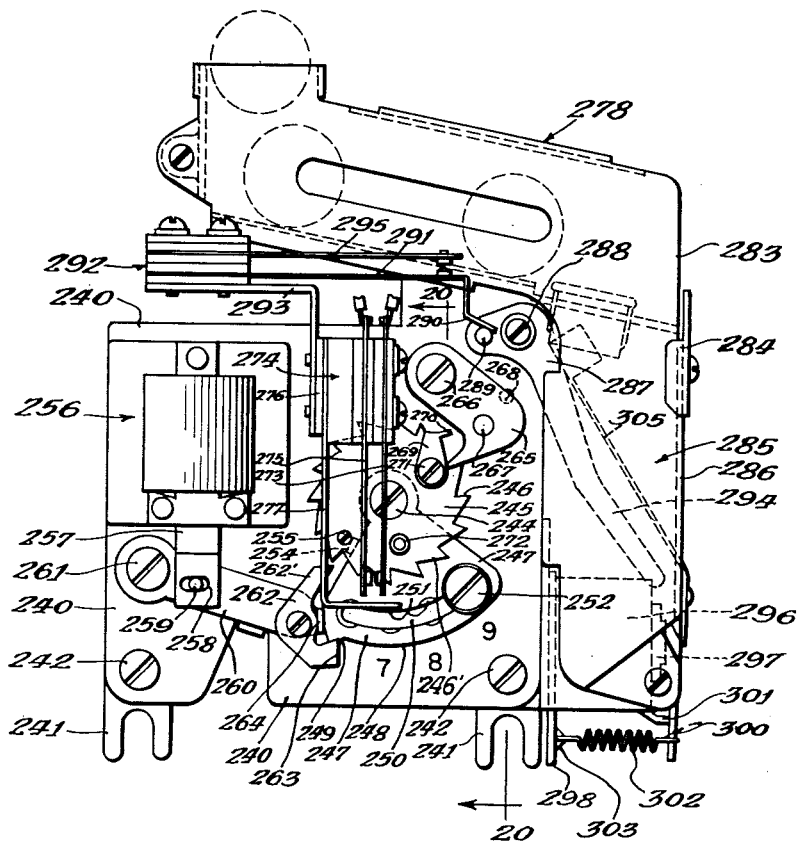
Fig. 19 is a front elevational view of a quickly attachable portion of my coin changer for preventing the dispensing of change until a predetermined number of small coins have been received thereby.
Figure 20:
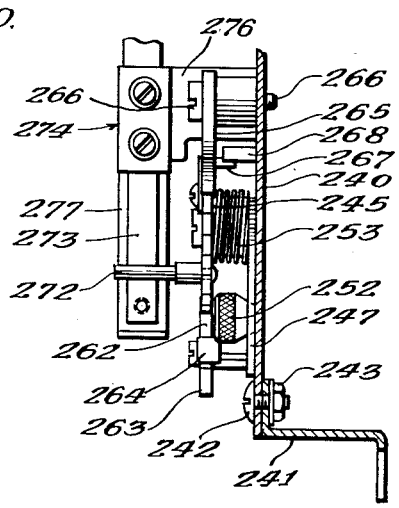
Fig. 20 is a fragmentary sectional view of the same taken on the line 20—20 in Fig. 19.
Figure 21:
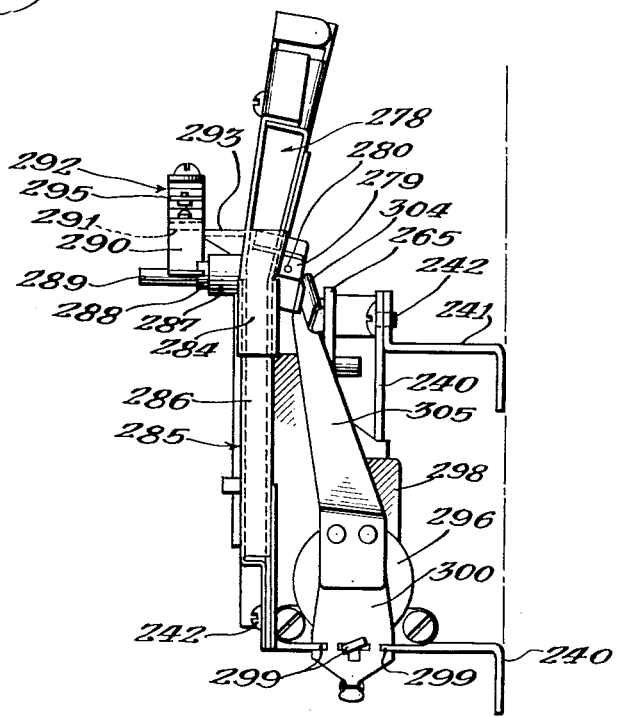
Fig. 21 is an end view of said attachable portion taken from the right of Fig. 19.

Upon the rear side of the back plate 20, or elsewhere adjacent thereto, a support plate 240 is readily mountable as by a plurality of brackets 241 and screws and nuts 242 and 243, respectively (Figs. 19 to 21). Centrally located upon the face of said support plate is a shaft-screw 244 upon which is rotatably mounted a ratchet wheel 245 having teeth 246 thereon. Pivoted upon the shaft-screw 244 between the ratchet wheel and the plate 240 is an adjusting frame 247 having an arc-shaped lower edge 248 upon the latter of which may be formed a pointer 249. Adjacent said lower edge an arc-shaped slot 250 is formed in the frame 247 and countersunk at spaced intervals, as at 251, to receive the bottom of a set-screw 252 which may be threaded into the plate 240.

About the hub of said ratchet wheel a tension spring 253 is provided having one of its ends attached to a stop-bracket 254 formed on a side edge of the frame 247 and having its other end attached to a screw 255 which is threaded through the ratchet wheel and protrudes from the back side thereof. The spring 253 tends to rotate the ratchet wheel 245 in a counter-clockwise direction, as viewed in Fig. 19, said rotation being stopped when the screw 255 on said ratchet wheel comes into contact with the stop-bracket 254 on the frame 247. It will thus be understood that the normal inactive position of the ratchet wheel 245 is determined by the position of the stop-bracket, which may be changed by pivoting the adjusting frame 247 on the shaft-screw 244 as will be hereinafter explained.

Upon the left side of the support plate 240 (as shown in Fig. 19) is mounted a solenoid 256 which has a vertically slidable armature 257 in the lower end of which may be formed a slot 258. A pin 259 fixed upon an arm 260, which is pivoted upon a post 261 attached to the plate 240, rides in said slot. Upon the extremity of the arm 260 is pivotally mounted a ratchet wheel advancing pawl 262 upon the upper portion of which is formed an advancing finger 262' engageable with the teeth 246 of the ratchet wheel one at a time. Upon the lower portion of said advancing pawl is formed a heel 263 which engages a flat back portion 246' of a succeeding tooth 246 on the ratchet wheel after the advancing finger 262 has engaged one of said teeth 246 and has advanced the ratchet wheel a distance equal to the space between the teeth thereon. The heel 263 thus serves to insure that the ratchet wheel may be advanced only one tooth at a time by the finger 262'. A lip 264 may be provided on the extreme end of the arm 260 to limit the arc through which the pawl 262 may pivot.

Above and to one side of the ratchet wheel 245 another pawl 265 is pivotally mounted upon a screw-pin 266 which may be threaded into the plate 240. The pawl 265 is engageable with the teeth 246 of the ratchet wheel and has provided thereon a pin 267 which protrudes from the rear side of said pawl, said pin being arranged to contact a second pin 268 attached to the plate 240 to limit the pivoting motion of said pawl.

A bracket 269 having a small lip 270 formed thereon is attached to the ratchet wheel 245 over one of the teeth by means of a screw 271. Also attached to said ratchet wheel is a pin 272 which will move, in the rotation of said wheel, into contact with a spring leaf 273 of a switch 274 having another spring leaf 275. The switch 274 may be mounted upon the plate 240 as by a bracket 276 and a guard 277 may be applied about said spring leaves of the switch if desired.

Figure 23:
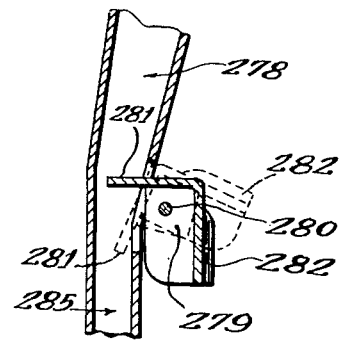
Fig. 23 is a fragmentary cross-sectional view taken on the line 23—23 in Fig. 22 to show the action of said coin trap.

A diagonally disposed coin chute, shown generally at 278, is mounted in any suitable fashion upon the upper portion of the plate 240. At the lower end of said coin chute ears 279 (Fig. 23) may be formed on the back side thereof for supporting a pin 280 upon which may be mounted a counterweighted coin-trap having a floor portion 281 which is held across an opening in the floor of said chute in a well-known manner by a counterweight 282. The lower end of the chute 278 is open as at 283, and, if desired, an adjustable bracket 284 may be provided at the lower portion of said opening to tend to halt the diagonally downward travel of coins through said chute.

Extending downwardly from beneath the coin-trap floor 281 is a vertical coin chute 285 having one closed side 286. To the left of the upper end of the chute 285 (as viewed in Fig. 19) a crank 287 is pivotally mounted upon a post 288. A pin 289 is provided upon said crank adjacent said post and said pin is in contact with an end 290 of a spring leaf 291 of a spring leaf switch 292 which may be mounted upon a bracket 293 attached to the bracket 276. The leaf 291 tends to hold the pin 289 downwardly and thus hold an arm 294 of the crank 287 in a normal diagonal position across the interior of the chute 285 as illustrated in Fig. 19. Coins which enter the coin chute 278 roll downwardly therethrough. If such a coin is of a sufficient weight to depress the coin-trap floor 281 and fall past the same, said coin enters the coin chute 285 and, in dropping vertically therethrough, pivots the arm 294 out of its position across the interior of said latter chute. In so doing the pin 289 is moved upwardly to raise the spring leaf 291 into contact with another spring leaf 295 of the switch 292.

Figure 22:
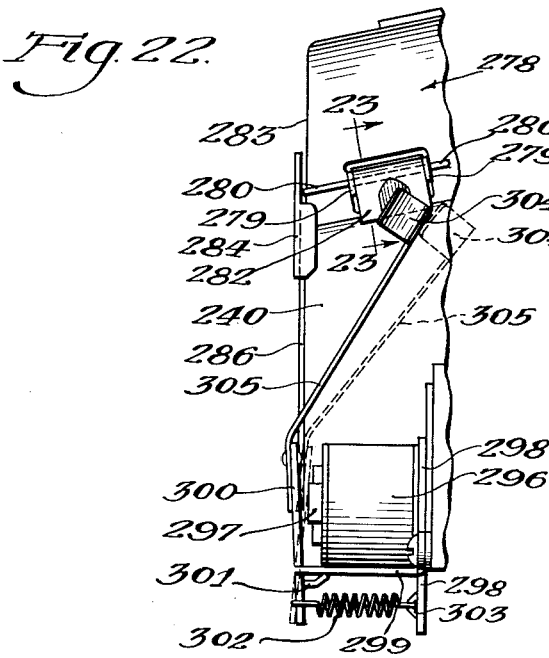
Fig. 22 is a fragmentary back elevational view of the same showing the action of a solenoid controlled coin-trap retaining mechanism.

A solenoid 296 (Fig. 22) having a solid core 297 may be suitably mounted, as by a bracket 298, upon the rear side of the chute 285 adjacent the base thereof. A second bracket 299 may be attached to the bracket 298 and upon the extremity of the former, adjacent the core 297 of the solenoid 296, may be pivotally mounted, in any suitable manner, an arm 300 which is arranged to pivot only in a vertical plane toward or away from said core. A stop 301 may be provided on the arm 300 contactable with the bottom of the bracket 299 in order to limit the movement of said arm away from said core, and a tension spring 302 may be attached at one of its ends to the lower end of said arm and at its other end to an eye 303 provided on the bracket 298. Said spring, it will be understood, tends to hold the arm 300 in its normal position away from the core 297 and in so doing holds a blocking member 304 behind the counterweight 282 of the coin-trap to prevent the floor 281 from being depressed, said blocking member being formed upon the upper extremity of a finger 305 attached, as by rivets, to the arm 300 (Figs. 21 and 22). It is thus evident that when the solenoid 296 is energized, arm 300 is moved toward the core 297 of the solenoid 296 and carries with it the finger 305 to free the counterweighted coin-trap.

Referring to Fig. 24 of the drawings, electric current may be supplied to my coin changer through wires 310 and 311 from a power source not shown. From the wire 311 a conductor 312 carries current to the spring leaf 103 of the switch 101 operated by the arm 106. When the level of coins in the tube 82 is above a predetermined level the switch 101 will be closed and current from the leaf 103 will travel through the leaf 102 and a conductor 313 to the solenoid 136, the circuit being completed by a conductor 314 extending from said solenoid to the wire 310. It will thus be understood that so long as the level of coins in the tube 82 remains above a predetermined level, the solenoid 136 will be energized to hold the finger 146 away from the back of the plate 36 and the counterweight 39 attached to the latter will cause the finger 41 to remain withdrawn from its blocking position across the coin passages 31 and 32. On the other hand, when the level of coins within the tube 82 is reduced to a level below a predetermined minimum, the lever 106 will be pivoted toward said tube to open the switch 101 and thus de-energize the solenoid 136. When this condition exists, the finger 146 will be carried against the back of the plate 36 by the action of the spring 148 and the finger 41 on the plate 36 will be moved into a blocking position across the coin passages 31 and 32.

The solenoid 141 is energized, while the coin changer is inactive, by means of a circuit comprising a lead 315 which extends from the wire 311 to said solenoid, a closed switch 316 being located in said lead, and by means of a lead 317 which extends from the solenoid to the wire 310. While the solenoid 141 is thus energized it retracts the finger 150 from a position against the back of the plate 36 and the counterweight 39 thereon causes said plate to pivot on the pin 34 to retract the finger 41 from its position across the coin passages 30, 31 and 32.

The wire 311 is attached to the spring leaf 97 of the switch 95 and, when said switch is moved to a closed position in a manner hereinafter described, current from the wire 311 will flow through the spring leaf 97 into the leaves 96 and 98. From the leaf 98 said current may be conducted by any suitable circuit (not shown) to operate a vending machine or the like. From the leaf 96, however, said current flows into a wire 318. From the wire 318 a lead 319 conducts said current to a relay solenoid 320, the circuit thereto being completed by a lead 321 which extends from said solenoid to the wire 310. Upon the closing of the switch 95 the solenoid 320 is energized to open the switch 316 and thus de-energize the solenoid 141. It will be understood that, while the latter solenoid is inactive, the finger 150, motivated by the spring 151, presses against the rear side of the plate 36 to cause the same to pivot on the pin 34 and carry the finger 41 into a blocking position across the coin passages 30, 31 and 32, the floor 91 being retracted from the passage 30 by the action of the finger 94 upon the finger 93 of the arm 90 (Fig. 15). When, however, the switch 95 is again opened, the solenoid 320 is de-energized and the switch 316 is automatically closed by gravity or other means (not shown) to re-energize the solenoid 141, thereby causing the plate 36 to be pivoted by the counterweight 39, the finger 41 to be withdrawn from the coin passages, and allowing the floor 91 to re-enter the passage 30.

While the switch 95 is closed, and if that portion of the coin changer shown in Figs. 19 to 23 is not being utilized, the current in the wire 318 is directed to a contact point 322 within a plug 323, and thence into a switch bar 324 which may be spring-loaded by means of a compression spring 325 tending to hold said bar against the contact point 322 and against a similar point 326. From the latter contact point said current flows through a wire 327, thence into a wire 328 connected thereto, and finally to the source of mechanical motion for motivating the coin dispensing slide 115. When the motor 58 is used as said motivating source, the wire 310 is connected to the side of said motor opposite the side thereof to which the wire 328 is attached (Fig. 24). When the solenoid and dash-pot arrangement shown in Figs. 16 and 17 is used to motivate the coin dispensing slide, the switch 167 is placed in the wire 310 adjacent the latter's connection to the solenoid 161 (Fig. 25). When, however, the device is modified as illustrated in Fig. 18, the wire 328 is attached to one side of the solenoid 195. From the other side of said solenoid a lead 329 is attached to the spring leaf 229 of the switch 225 and to the leaf 227 of the switch 226, the wire 310 being attached to the leaf 228 of the latter switch, and a lead 330 extending from the wire 310 to the leaf 230 of the switch 225 (Fig. 26).

When that portion of the coin changer illustrated in Figs. 19 to 23 is utilized (for purposes hereinafter fully explained), a male plug 331, having contact points 332, 333 and 334 thereon, may be inserted into the plug 323. A dielectric post 335 on the plug 331 unseats the switch bar 324 from the contact points 326 and 322, compressing the spring 325 in so doing, and the contact points 332, 333 and 334 make contact, respectively, with corresponding contact points 336, 337 and 338 on the plug 323. The contact point 336 is connected to the wire 327, the point 337 is connected to the wire 318 and the point 338 is connected to the wire 310 by means of a lead 339.

With the plug 331 inserted into the plug 323, the operation of the solenoids 136, 141 and 320 will remain unchanged, but the path of the current from the switch 95 to the motor 58, the solenoid 161, or the solenoid 195, as the case may be, is considerably different from that above described. When the switch 95 is closed with the plug 331 inserted into the plug 323, current in the wire 318 passes through the contact points 337 and 333 into a lead 340 which extends to the spring leaf 275 of the switch 274. A lead 341 attached to the lead 340 conducts current to the solenoid 296, the circuit through the latter being completed by means of a lead 342 attached to a lead 343 which extends from the contact point 334 to the spring leaf 295 of the switch 292. It will thus be evident that the solenoid 296 will be energized immediately to move the coin-trap block out of a blocking position to free the trap upon the closing of the switch 95.

A lead 344 extends from the lead 340 to one side of the solenoid 256, and from the other side of said solenoid a lead 345 extends to the spring leaf 291 of the switch 292. It will thus be understood that, with the switch 95 in a closed position the solenoid 256 will be energized each time the switch 292 is closed by a pivoting of the arm 294.

When the switch 274 is closed, current from the lead 340 will flow therethrough and enter a lead 346 which is connected to the contact point 332. From the contact point 332 said current flows through the contact point 336 and thence through the wires 327 and 328 to the motor 58, the solenoid 161, or the solenoid 195 as above explained.

Inasmuch as the switch 274 is closed for only an instant, as will be hereinafter explained, a relay solenoid 347 is employed in the circuit to retain said circuit in a closed condition until the switch 95 is opened. To this end the wire 327 is connected to one side of the solenoid 347 and a lead 348 extends from its other side to the wire 310. At the instant the switch 274 is closed the solenoid 347 is energized to close a switch shown generally at 349, one side of said switch being connected to the wire 328 and its other side being connected to a wire 350 which extends to the wire 318. Thus even after the switch 274 has been opened, it is evident that the flow of electric power will not be interrupted until the switch 95 is opened.

*Operation*

When the coin passages 30, 31 and 32 are of a size for receiving United States nickels, dimes and quarters, respectively, a nickel received at the top of the passage 30 will normally drop downwardly therethrough to the floor 91 (Figs. 1 and 3), which is ordinarily positioned across said passage, and will roll diagonally downwardly across said floor and into the coin tube 82. The lowermost of said nickels which have thus been received by the tube will rest on the upper surface of the transverse slide 130 in the opening 116 of the dispensing slide 115 (Figs. 9–12), the other coins in said tube being stacked upon said lowermost coin. So long as the level of coins in the tube 82 is above a predetermined level the switch 101 (Fig. 1) will be held in a closed position and the finger 41 will be held clear of the coin passages in the manner above described. If, however, the level of the nickels in the tube is below said predetermined level, the flange 107 on the arm 106 will enter said tube, the switch 101 will be opened, the solenoid 136 de-energized, and the finger 41 will move into a blocking position across the coin passages 31 and 32 as aforesaid (Figs. 1 and 14). While the latter condition exists, dimes and quarters inserted into the passages 31 and 32, respectively, will drop to the finger 41, roll diagonally down the same and be expelled from the changer in the path indicated by the arrow and outline of a coin 355 in Fig. 1. An appropriate chute (not shown) may be provided to return dimes and quarters so expelled to the customer. It will be understood, of course, that while said condition exists, nickels may be received by said changer, in the manner above described, to build up the supply thereof in the tube 82.

When the level of nickels in said tube 82 is above the predetermined level, a quarter inserted into the passage 32 will drop downwardly therethrough to the coin seat 51, pivoting the latter to the full-line position shown in Fig. 12 and closing the switch 95, said quarter being retained in the coin seat 51 by the presence of the coin gate 48 across the open side of the passage 32, and the presence of said quarter in the seat 51 holding the switch 95 in said closed position. If the plug 331 has not been inserted into the plug 323 current will be supplied immediately to the motor 58 (Fig. 1), the solenoid 161 (Fig. 17), or to the solenoid 195 (Fig. 18), as the case may be. If the motor 58 is employed, said motor will turn the worm 60 and drive the gears 62, 65 and 122. The latter gear will carry the roller 129 in a circular path and within the race-way 121 to move the coin dispensing slide 115 on the rollers 111, 112 and 113 to the right (as viewed in Fig. 1) and back again with each revolution of the gears. With each reciprocation of said dispensing slide, one nickel will be dispensed from its lowermost position in the stack of nickels resting on the top surface of the transverse slide 130 (see Fig. 11). Since the gears 62 and 65 make one complete revolution with each reciprocation of the slide 115, the pin 66 extending between said gears will be brought into contact with a tooth 70 on the ratchet wheel 67 each time a nickel is dispensed. Said ratchet wheel will in this manner be advanced the distance between its adjacent teeth each time a nickel is dispensed, the pawl 79 on the arm 56 of the coin seat 51 holding said ratchet wheel after each advancement and preventing the same from being returned to its original position by the action of the spring 71.

When the ratchet wheel has been advanced four teeth, for example, the high cam surface 77 on the hub 74 of the ratchet wheel 67 (Figs. 7, 8 and 12) will have been moved into contact with the arm 47 to cause the same to pivot the U-frame 46 on the pin 44 and move the coin gate 48 out of a blocking position across the open side of the coin passage 32. The quarter will immediately roll from the coin seat 51 and the passage 32 in the path indicated by the arrow and outline of a coin 356 in Fig. 12. Suitable coin chutes may be provided to conduct the quarter to a cash box (not shown).

As the quarter rolls from the seat 51, said seat immediately pivots back to its original position (shown in dotted lines in Fig. 12), thus opening the switch 95 to stop the motor 58 and at the same time disengaging the pawl 79 from the ratchet wheel 67. The spring 71 immediately returns the ratchet wheel to its original position with the pin 73 resting against the pin 72 (Fig. 3).

The operation of the coin changer in making change for a dime is similar to that described above with regard to a quarter. A dime inserted into the coin passage 31, when a predetermined number of nickels is retained in the coin tube 82, will fall vertically into the coin seat 50 to pivot the same to close the switch 95 (Fig. 13) and start the motor 58. The closing of switch 95 permits coin seat 51 to pivot by gravity to move pawl 79 into engagement with ratchet 67. When one nickel, for example, has been dispensed in the manner above explained, the ratchet wheel will have been advanced one tooth and the low cam surface 76 thereon will have been moved into contact with the arm 47 causing said arm to pivot the U-frame 46 and move the coin gate 48 from its position across the opening in the side of the coin passage 31, the required movement of the arm 47 and gate 48 being less in this case than that required to cause the gate to clear the quarter coin passage 32 (see Fig. 2). The dime will then roll from the coin seat 50 in the path followed by the quarter, and the seat will pivot back to its original position to open the switch 95 to stop the motor 58 and to disengage the pawl 79 from the ratchet 67, the latter returning to its original position in the aforesaid manner.

If, for example, it is desired that two nickels be dispensed for each dime received, or that five nickels be ejected for each quarter inserted into the changer, the necessary adjustment may quickly be made by moving the pin 72 (Fig. 3) the distance of the space between consecutive teeth on the ratchet wheel, opposite the direction in which the wheel is advanced during the dispensing of nickels. The position of the pin 72 thus adjusted is shown in Fig. 3 by the numeral 72'. It will be understood that the simple adjustment of the position of the pin 72 changes the original position of the ratchet wheel and thus requires that the wheel be advanced more times to bring the cam surface into contact with the arm 47 to cause the release of the dime or quarter, as the case may be.

The functioning of the coin seats 50 and 51, the ratchet wheel 67, and the coin gate 48 is the same in all three of the variations of my coin changer. When the solenoid and dash-pot arrangement shown in Figs. 16 and 17 is employed instead of the motor 58 and its gears, the solenoid 160 is energized immediately upon the closing of the switch 95 to move the armature 162 upwardly at a speed controlled by the dash-pot. As the armature reaches the top of its stroke, the toggle switch 167 is opened to break the circuit to the solenoid. Said armature is then moved downwardly by gravity at a speed controlled by said dash-pot, and as it reaches the bottom of its stroke, the toggle switch is again closed to remake the circuit to the solenoid, thus repeating the cycle of operation successively so long as the switch 95 is closed, the panel 191 being moved into contact with the ratchet wheel 67 to advance the same one tooth each time the slide 115 is moved on its supporting rollers to dispense a nickel.

In the variation of the coin changer shown in Fig. 18, current is supplied to the solenoid 195 when the switch 95 is closed by the presence of a dime or quarter in the coin seat 50 or 51, respectively, said current being conducted to the solenoid through the switch 225 which is held closed by the arm 218 of the toggle 217 when said changer is in an inactive condition. Said solenoid draws the armature 196 to the right (as viewed in the Fig. 18) and in so doing pivots the arm 199 in a counter-clockwise direction to move the coin dispensing slide 115 to its dispensing position shown in said figure. In the pivoting of the arm 199 tension is increased in the spring 215 to pivot the rack 204 in a counterclockwise direction at a speed controlled by the wind-vane 210. When said rack has been pivoted to a certain point, the finger 211 thereon exerts sufficient force upon the side of the arm 219 of the toggle 217 to cause the latter to overcome the action of the spring leaf 221 and snap into the position shown in Fig. 18, in which position the arm 219 opens the switch 226 and the switch 225 is allowed to open to break the circuit to the solenoid 195. The tension in the springs 214 and 215 then return the arm 199 and the rack 204, at a speed controlled by the wind-vane, toward their original positions, the dispensing slide being returned at the same rate by the action of the tension spring 223. When the finger 211 of the rack 204 reaches the inside surface of the arm 218 of the toggle and exerts sufficient force thereon, the toggle again overcomes the action of the spring leaf 221 and snaps to a position in which the arm 218 makes contact with the spring leaf 230 to close the switch 225 to thus remake the circuit to the solenoid 195 and cause the cycle to repeat. In this manner the coin dispensing slide is caused to reciprocate to dispense nickels, the ratchet wheel 67 being advanced one tooth by the pawl hereinbefore mentioned which is mounted upon the bracket 203 and described above in detail. It will be evident that the action of the wind-vane gives a delaying effect to the making and breaking of the circuit to the solenoid and the reciprocating action of the dispensing slide is thus carried on smoothly and at substantially a constant speed, this being one of the objects of the invention.

When it is desired to employ either of the forms of my coin changer in connection with a vending machine adapted to vend articles at odd prices, such as six cents, seven cents, or eight cents, the plug 331 is inserted into the plug 323. A dime or quarter may then be inserted in the proper one of the coin passages 31 or 32 and the proper number of pennies may thereafter be inserted into the coin passage 278. Inasmuch as the switch 95 will not be closed until a dime or quarter has been received, the solenoid 296 will not theretofore be activated and the coin blocking member 304 (Fig. 22) will prevent the tilting of the coin-trap and the entrance of pennies into the coin chute 285. However, after a dime or quarter has been received, the switch 95 will be closed and current supplied to the solenoid 296 to withdraw the member 304 from its blocking position as hereinbefore described. Thereafter a penny inserted in the coin passage 278 will roll down the same, fall through the coin-trap into the coin chute 285, and pass downwardly through the same to a cash box (not shown).

In passing through the chute 285, the penny will pivot the arm 294 and momentarily cause the switch 292 to be closed. The closing of said switch actuates the solenoid 256 causing the arm 260 to be raised and bringing the advancing finger 262′ of the advancing pawl 262 into contact with a tooth 246 of the ratchet wheel 245. Each time a penny is thus passed through the coin chute 285 the ratchet wheel 245 is advanced one tooth by the finger 262′, the heel 263 being provided to insure that the sudden motion imparted to said ratchet wheel will not carry the same further than the space of one tooth. The pawl 265 retains said wheel in its advanced position and prevents the same from being returned to its original position by the action of the spring 253.

When a predetermined number of pennies has been thus passed through the coin chute 285, the ratchet wheel will have been advanced to a position in which the pin 272 thereon will close the switch 274 and the pawl 265 will have ridden to a position on the top surface of the bracket 269. In this position the pawl will not be able to hold the ratchet wheel but will be thrown in a counter-clockwise pivoting motion away from said wheel by the lip 270 on the bracket 269. In the brief moment in which the pawl is thus out of contact with the ratchet wheel, the latter will be returned to its original position by the spring 253, said original position being determined by the position of the stop-bracket 254 formed upon the frame 247.

In the Fig. 19 I have shown the frame and its bracket 254 in a position in which the switch 274 will be closed each time a penny passes through the coin chute 285. The adjustment thus shown is used when the coin changer is used in conjunction with a vending machine arranged to dispense six-cent articles. If the price of such articles were seven cents, the proper adjustment would be made by releasing the set screw 252 and pivoting the frame 247 to a position in which the pointer 249 thereon would be opposite the numeral "7" shown on the face of the plate 240. If the price of the article were eight or nine cents, the frame would be pivoted to the appropriate position in which the pointer would be opposite the proper numeral. It will be understood that pivotally adjusting the position of the frame changes the position of the stop-bracket 254 and thus changes the original position from which the ratchet wheel will be advanced. If the pointer 249 is positioned opposite the numeral "7," for example, the ratchet wheel must be advanced two teeth before said wheel causes the switch 274 to be closed and the pawl 265 is disengaged therefrom to allow said wheel to return to its starting position. This would require the passage of two pennies through the coin chute 285.

Inasmuch as the circuit to the motor 58, the solenoid 161, or the solenoid 195 will not be completed until the switch 274 has been closed, the value of that portion of my coin changer shown in Figs. 19 to 23 is evident in that change will not be dispensed until after a proper number of pennies has been inserted into the coin chute 278 and passed through the chute 285.

It will be understood that for so long as the switch 95 is held in a closed position, and thus while the coin changer is in operation, the solenoid 141 will be de-energized and the finger 41 will consequently move to its position across all three of the coin passages 30, 31 and 32. Thus, if any coin is inserted into any of these three passages while the coin changer is in operation, said coin will be discharged from the changer in the path indicated by the arrow 355 in Fig. 1.

If at any time the supply of nickels in the tube 82 reaches a maximum level in which the uppermost coin therein rests against the lower end of the arm 87, as illustrated in Fig. 6, the arm will be pivoted upon the pin 86 and the floor 91 withdrawn from its normal position in the coin passage 30. Nickels then inserted in the passage 30 will fall vertically through the entire length of the same and from the bottom of said passage may be conducted by a suitable coin chute (not shown) to a cash box.

The slide 130 is provided as a means by which the nickels in the tube 82 may be removed by the owner of the machine, for example, without the necessity of operating the dispensing slide 115. By pulling on the lip 131 said transverse slide 130 may be pulled forward until the spring 134 engages the slot 132. In this position the opening 130′ in said slide is positioned directly beneath the opening 116 in the slide 115 and all of the coins in the tube 82 will fall through said openings. The slide 130 may then be replaced in its normal position and operation of the coin changer resumed. Said slide is of course suitably enclosed so that it is not accessible except to one having a key to the enclosure or other special means of access.

The foregoing detailed description has been given for clearness of understanding only, and no unnecessary limitations should be understood therefrom.

I claim:

1. A coin changing device comprising: a coin passage into which a coin to be changed may be passed; a pivotally mounted coin seat in said passage adapted to receive said coin and be held in a pivoted position thereby; a coin gate adjacent said coin seat for retaining said coin upon the latter; a switch held in a closed position by said coin seat while the latter is in said pivoted position; a change supply container; a coin dispensing slide in association with said container; a solenoid energized upon the closing of said switch, said solenoid having a movable armature in operative connection with said slide for moving the same to eject change from said container; a dash-pot for controlling the speed of movement of said armature; a ratchet wheel rotatively advanced in the movement of said armature; means for holding said wheel in advanced position; and means operable by said wheel when the same has advanced to a predetermined position to release said holding means and to move said gate to release said coin from said seat.

2. A coin changing device comprising: a coin passage into which a coin to be changed may be passed; a pivotally mounted coin seat in said passage adapted to receive said coin and be held in a pivoted position thereby; a coin gate adjacent said coin seat for retaining said coin upon the latter; a switch held in a closed position by said coin seat while the latter is in said pivoted position; a change supply container; a coin dispensing slide in association with said container; a solenoid energized upon the closing of said switch, said solenoid having a movable armature; a lever movable by said armature and operatively connected to said slide for moving the latter to eject change from said container; a rack operatively connected to said arm and movable therewith; a wind-vane rotated by said rack whereby the speed of movement of said arm and said slide are controlled; a ratchet wheel rotatively advanced in the movement of said armature; means for holding said wheel in advanced position; and means operable by said wheel when the same has advanced to a predetermined position to release said holding means and to move said gate to release said coin from said seat.

3. A coin-changing mechanism comprising: a coin chute for receiving the coin to be changed, said chute having an outlet opening; a gate normally blocking said opening; a member in said chute movable away from normal position by the impact of a falling coin in the chute and comprising a coin seat for supporting the coin adjacent said blocked outlet opening and a switch-actuating arm; a change dispensing device comprising a magazine for the coins to be delivered as change, an ejector and electrically-operated power means for operating said ejector; a switch arranged to be closed by said switch arm when the same is moved by impact thereon of the coin to be changed and to thereupon energize said power means and cause the same to operate said ejector a predetermined number of times to deliver the number of coins required as change; a ratchet device operable by said power means one step each time a change coin is ejected; and means operable by said ratchet device when said predetermined number of change coins have been delivered to remove said gate from coin-blocking position, thereby causing said first-mentioned coin to be discharged from said chute and said movable member thereupon to return to its normal position, said switch-actuating arm being thus moved away from its switch-closing position to deenergize said power means and thereby terminate the operation of said change ejector.

4. A coin-changing mechanism comprising: a coin chute for receiving the coin to be changed, said chute having an outlet opening; a gate normally blocking said opening; a pivoted member in said chute, said member being movable under the impact of a falling coin in said chute and comprising a coin seat for supporting the coin adjacent said blocked outlet opening and a switch-actuating arm; a change dispensing device comprising a magazine for the coins to be delivered as change, an ejector and electrically-operated power means for operating said ejector; a switch arranged to be closed by said switch arm when the same is moved by impact thereon of the coin to be changed and to thereupon energize said power means and cause the same to operate said ejector a predetermined number of times to deliver the number of coins required as change; a ratchet device operable by said power means one step each time a change coin is ejected; and means operable by said ratchet device when said predetermined number of change coins have been delivered to remove said gate from coin-blocking position, thereby causing said first-mentioned coin to be discharged from said chute and said pivoted member to thereupon return to its original position, said switch-actuating arm being thus moved away from its switch-closing position to deenergize said power means and thereby terminate the operation of said change ejector.

5. A coin-changing mechanism comprising: a coin chute for receiving the coin to be changed, said chute having an outlet opening; a gate normally blocking said opening; a pivoted member in said chute, said member being movable under the impact of a falling coin in said chute and comprising a coin seat for supporting the coin adjacent said blocked outlet opening and a switch-actuating arm; a change dispensing device comprising a magazine for the coins to be delivered as change, an ejector and electrically-operated power means for operating said ejector; a switch arranged to be closed by said switch arm when the same is moved by impact thereon of the coin to be changed and to thereupon energize said power means and cause the same to operate said ejector a predetermined number of times to deliver the number of coins required as change; a ratchet device operable by said power means one step each time a change coin is ejected; means operable by said ratchet device when said predetermined number of change coins have been delivered to remove said gate from coin-blocking position, thereby causing said first-mentioned coin to be discharged from said chute and said pivoted member to thereupon return to its original position, said switch-actuating arm being thus moved away from its switch-closing position to deenergize said power means and thereby terminate the operation of said change ejector; and means for adjusting the starting position of the ratchet to thereby vary the number of change coins to be delivered upon each cycle of operation.

6. A coin-changing mechanism comprising: a coin chute for receiving the coin to be changed, said chute having an outlet opening; a gate normally blocking said opening; a member in said chute movable under the impact of a falling coin in the chute and comprising a coin seat for supporting the coin adjacent said blocked outlet opening and a switch-actuating arm; a change dispensing device comprising a magazine for the coins to be delivered as change, an ejector and electrically-operated power means for operating said ejector; a switch arranged to be closed by said switch arm when the same is moved by impact thereon of the coin to be changed and to thereupon energize said power means and cause the same to operate said ejector a predetermined number of times to deliver the number of coins required as change; a ratchet device operable by said power means one step each time a change coin is ejected; means operable by said ratchet device when said predetermined number of change coins have been delivered to remove said gate from coin-blocking position, thereby causing said first-mentioned coin to be discharged from said chute and said movable member to thereupon return to its original position, said switch-actuating arm being thus moved away from its switch-closing position to deenergize said power means and thereby terminate the operation of said change ejector; and an auxiliary odd-change device electrically connected to said coin-changing mechanism to prevent the aforesaid operation of the latter until after predetermined operation of said odd-change device, said odd-change device including a switch in circuit with said power means and thus being required to be closed before said power means can operate said ejector, a coin chute for small coins, such as pennies, and step means operable by coins falling in said last-mentioned chute and being arranged to close said second switch and thereby cause energization of said power means only after said step means has been operated a predetermined number of times by one or more coins passing through said small-coin chute.

7. A coin-changing mechanism comprising: a coin chute for receiving the coin to be changed, said chute having an outlet opening; a gate normally blocking said opening; a member in said chute movable under the impact of a falling coin in the chute and comprising a coin seat for supporting the coin adjacent said blocked outlet opening and a switch-actuating arm; a change dispensing device comprising a magazine for the coins to be delivered as change, an ejector and electrically-operated power means for operating said ejector; a switch arranged to be closed by said switch arm when the same is moved by impact thereon of the coin to be changed and to thereupon energize said power means and cause the same to operate said ejector a predetermined number of times to deliver the number of coins required as change; a ratchet device operable by said power means one step each time a change coin is ejected; means operable by said ratchet device when said predetermined number of change coins have been delivered to remove said gate from coin-blocking position, thereby causing said first-mentioned coin to be discharged from said chute and said movable member to thereupon return to its original position, said switch-actuating arm being thus moved away from its switch-closing position to deenergize said power means and thereby terminate the operation of said change ejector; and an auxiliary odd-change device, means for electrically connecting said odd-change device to said coin-changing mechanism to prevent operation of the latter until after predetermined operation of said odd-change device, said odd-change device including a switch in circuit with said power means and thus being required to be closed before said power means can operate said ejector, a coin chute for small coins, such as pennies, and step means operable by coins falling in said last-mentioned chute and being arranged to close said second switch and thereby cause energization of said power means only after said step means has been operated a predetermined number of times by one or more coins passing through said small-coin chute, means for causing obstruction of the passage of such small coins through said small-coin chute, and means operable by coin-actuation of said movable member in said first-mentioned chute when a coin to be changed is inserted in said chute for causing release of said obstructing means to permit passage of said small coins through said small-coin chute.

8. A coin-changing mechanism comprising: a coin chute for receiving the coin to be changed, said chute having an outlet opening; a gate normally blocking said opening; a member in said chute movable under the impact of a falling coin in the chute and comprising a coin seat for supporting the coin adjacent said blocked outlet opening and a switch-actuating arm; a change dispensing device comprising a magazine for the coins to be delivered as change, an ejector and electrically-operated power means for operating said ejector; a switch arranged to be closed by said switch arm when the same is moved by impact thereon of the coin to be changed and to thereupon energize said power means and cause the same to operate said ejector a predetermined number of times to deliver the number of coins required as change; a ratchet device operable by said power means one step each time a change coin is ejected; means operable by said ratchet device when said predetermined number of change coins have been delivered to remove said gate from coin-blocking position, thereby causing said first-mentioned coin to be discharged from said chute and said movable member to thereupon return to its original position, said switch-actuating arm being thus moved away from its switch-closing position to deenergize said power means and thereby terminate the operation of said change ejector; and means controlled by the volume of the coins in said magazine for returning to the customer a coin to be changed before the same actuates said movable member in case the volume of coins in said magazine is below a predetermined number.

9. A coin changing device comprising: a coin passage into which a coin to be changed may be passed; a pivotally mounted coin seat in said passage adapted to receive said coin and be held in a pivoted position thereby; a coin gate adjacent said coin seat for retaining said coin upon the latter; a switch held in a closed position by said coin seat while the latter is in said pivoted position; a change supply container; a coin dispensing means associated with said container; power means operable through the closing of said switch to cause said dispensing means to eject change from said container; a ratchet wheel rotatively advanced by said dispensing means each time a coin is dispensed thereby as change, said ratchet wheel being advanced by successive degrees; means for holding said ratchet in advanced position; and means operable by said ratchet wheel when the same has been advanced to a predetermined position to release said holding means and to cause said gate to be moved to release said coin from said seat, whereupon the latter will pivot to open said switch and stop the operation of said coin dispensing means.

10. A coin changing device comprising: a coin passage into which a coin to be changed may be passed; a pivotally mounted coin seat in said passage adapted to receive said coin and be held in a pivoted position thereby; a coin gate adjacent said coin seat for retaining said coin upon the latter; a switch held in a closed position by said coin seat while the latter is in said pivoted position; a change supply container; a coin dispensing means associated with said container; power means operable through the closing of said switch to cause said dispensing means to eject change from said container; a ratchet wheel adjustable to rest in any one of a plurality of selective rotative positions, said ratchet wheel being rotatively advanced therefrom by said dispensing means; means for holding said wheel in advanced position; and means operable by said wheel when the same has been advanced to a predetermined position to release said holding means and to cause said gate to be moved whereupon said coin will be released from said seat, the latter will pivot, and said switch will be opened to stop the operation of said coin dispensing means.

11. A coin changing device comprising: a coin passage into which a coin to be changed may be passed; a pivotally mounted coin seat in said passage adapted to receive said coin and be held in a pivoted position thereby; a coin gate adjacent said coin seat for retaining said coin upon the latter; a switch held in a closed position by said coin seat while the latter is in said pivoted position; a change supply container; a coin dispensing means associated with said container; power means operable through the closing of said switch to cause said dispensing means to eject change from said container; a ratchet wheel adjustable to rest in any one of a plurality of selective rotative positions, said ratchet wheel being rotatively advanced therefrom by said dispensing means; means for holding said wheel in advanced position; means operable by said wheel when the same has been advanced to a predetermined position to release said holding means and to cause said gate to be moved whereupon said coin will be released from said seat, the latter will pivot, and said switch will be opened to stop the operation of said coin dispensing means; and spring means for returning said ratchet wheel to any of said selective rotative positions.

12. A coin changing device comprising: a coin passage into which a coin to be changed may be passed; a pivotally mounted coin seat disposed within said chute, said coin seat being adapted to receive said coin and be held in a pivoted position thereby; a coin gate adjacent said coin seat for retaining said coin upon the latter; a switch held in a closed position by said coin seat while the latter is in said pivoted position; a change supply container; a coin dispensing means associated with said container; power means operable through the closing of said switch to cause said dispensing means to eject change from said container; a ratchet wheel adjustable to rest in any of a plurality of selective rotative positions, said ratchet wheel being rotatively and successively advanced by said coin dispensing means on each operation thereof; means for holding said wheel in advanced position; and means operable by said wheel when the same has been advanced to a predetermined position to release said holding means and to move said gate whereupon said coin will be released from said seat, the latter will pivot, and said switch will be opened to stop the operation of said coin dispensing means.

13. A coin changing device comprising: a coin passage into which a coin to be changed may be passed; a pivotally mounted coin seat disposed within said chute, said coin seat being adapted to receive said coin and be held in a pivoted position thereby; a coin gate adjacent said coin seat for retaining said coin upon the latter; a switch held in a closed position by said coin seat while the same is in said pivoted position; a change supply container; a coin dispensing means associated with said container and operated while said switch is closed to eject change from said container; a ratchet wheel rotatively advanced by said dispensing means each time a coin is dispensed thereby as change; means for holding said wheel in advanced position; means operable by said wheel when the same has been advanced to a predetermined position to release said holding means and to move said gate to release said coin from said seat; a member movable to a coin blocking position across said passage to prevent coins from passing through said passage while said switch is closed and said coin dispensing means is in operation; means for normally holding said member in non-obstructing position; and means operable by the closing of said switch to move said member to blocking position.

14. A coin changing device comprising: a coin passage adapted to receive a coin to be changed; a member in said passage arranged to be displaced by such coin and to be held in displaced position thereby; a coin gate positioned to retain the coin in engagement with said displaceable member; a switch arranged to be closed by movement of said member effected by the coin and to be held in closed position while said member remains displaced; a change supply container; a coin dispensing means associated with said container; power means operable through the closing of said switch to cause said dispensing means to eject change from said container; a ratchet wheel arranged to be rotatably advanced by said dispensing means each time a coin is dispensed thereby as change; means for holding said wheel in advanced position; and means operable by said wheel when the same has been advanced to a predetermined position to release said holding means and to cause said gate to be moved to release said coin, said displaceable member being thereupon automatically returnable to its original position to open said switch and stop the operation of said coin dispensing means.

15. A coin changing device comprising: means providing a coin passage into which a coin to be changed may be inserted; a coin seat adapted to receive said coin and to be moved thereby to an actuating position; an electrical circuit; power means therein; a switch in said circuit movable to closed position by said seat upon such movement of the latter and adapted to be held in closed position thereby while said coin seat is in such actuating position; means providing a second coin passage; a solenoid in said circuit; means operable by coin in moving through said second passage to energize said solenoid provided the above-mentioned switch is closed; a second switch in said circuit and thus also being required to be closed before said power means can be energized; step means actuated by the energization of said solenoid and being arranged to close said second switch and thus complete said circuit only after said step means has been operated a predetermined number of times by one or more coins passing through said second coin passage; a change supply container, and a coin dispensing means associated with said container and operable by said power means upon the closing of both said first and second switches, to eject change from said container.

16. A coin changing device as set forth in claim 15, in which said step means comprises a ratchet wheel, means for holding said wheel in an advanced position upon each step prior to its reaching its final or operative position determined by the number of coins inserted in said second coin passage, means operable by said wheel when in such final position after a predetermined number of coins has been inserted in said second coin passage for releasing said holding means, and means for thereupon returning said wheel to its initial position.

17. A coin changing device as set forth in claim 15 in combination with means normally disposed in said second coin passage for preventing the passage of coins therethrough and means operable through the closing of the first-mentioned switch to move said last-mentioned means to non-obstructing position.

References Cited in the file of this patent

UNITED STATES PATENTS

| 471,053 | Henry | Mar. 15, 1892 |
| 569,912 | Farnell | Oct. 20, 1896 |
| 769,572 | Stewart | Sept. 6, 1904 |
| 991,108 | Turbayne | May 2, 1911 |
| 1,084,305 | Watson | Jan. 13, 1914 |
| 1,158,537 | Muzzy | Nov. 2, 1915 |
| 1,582,659 | Baker | Apr. 27, 1926 |
| 1,587,902 | Crawford | June 8, 1926 |
| 2,081,193 | Breitenstein et al. | May 25, 1937 |
| 2,131,843 | McMakin | Oct. 4, 1938 |
| 2,147,954 | Kozel et al. | Feb. 21, 1939 |
| 2,183,611 | Goodman | Dec. 19, 1939 |
| 2,250,051 | Patzer | July 22, 1941 |
| 2,262,322 | Harris | Nov. 11, 1941 |
| 2,323,255 | Sutherland | June 29, 1943 |

FOREIGN PATENTS

| 477,177 | France | July 5, 1915 |
| 779,015 | France | Jan. 5, 1935 |
| 503,249 | Germany | July 24, 1930 |